# 2,743,264

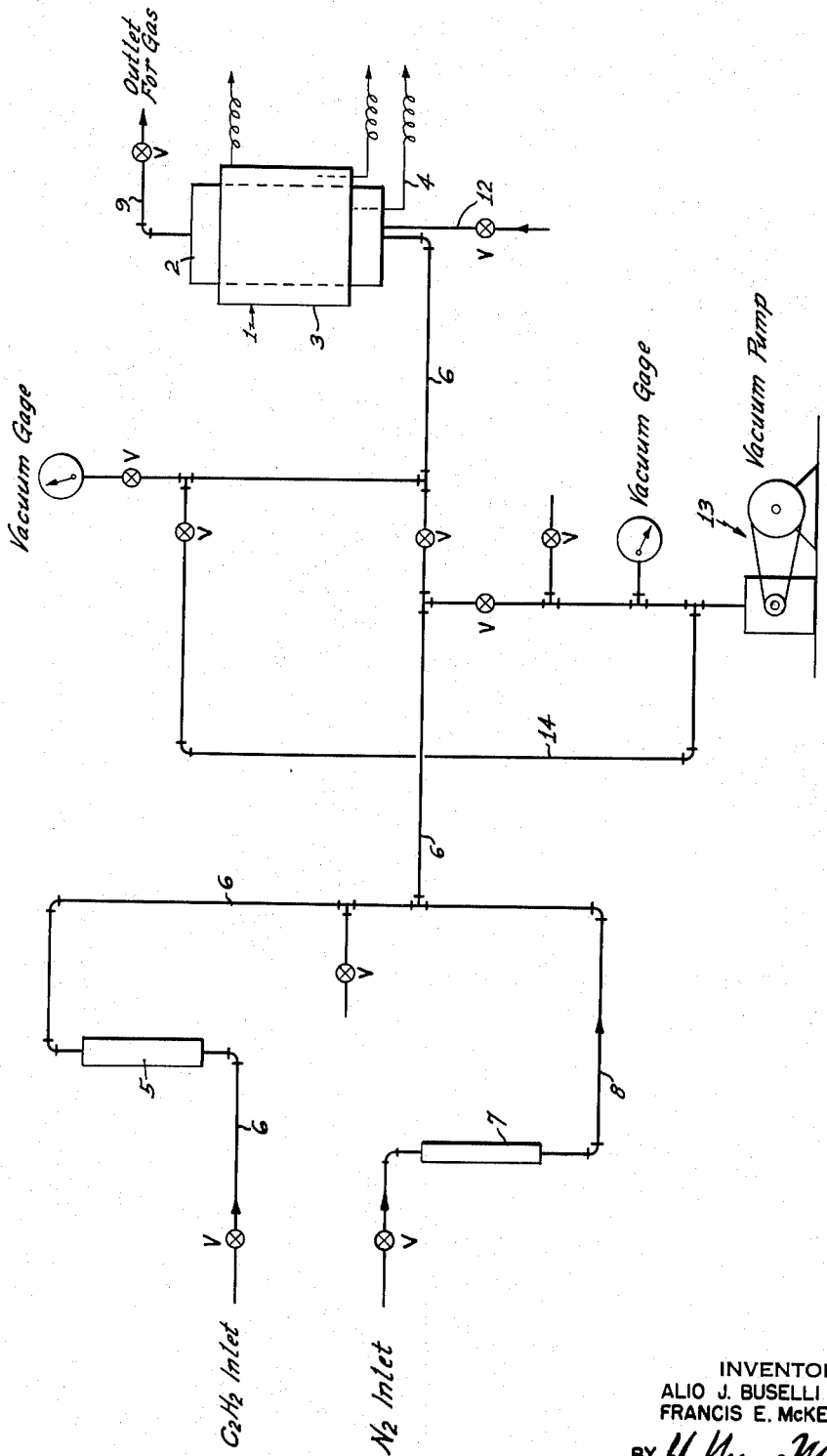

CATALYTIC POLYMERIZATION OF ACETYLENE

Alio J. Buselli, New Providence, N. J., and Francis E. McKenna, New York, N. Y., assignors to Air Reduction Company, Incorporated, New York, N. Y., a corporation of New York Application January 21, 1953, Serial No. 332,278

14 Claims. (Cl. 260—94.1)

This invention relates to the catalytic polymerization of acetylene for the production of polyacetylene, known also as cuprene or carbene, and has for its object the provision of an improved method of polymerization. More particularly, the invention provides the use of an improved copper-bearing catalyst characterized by improvements in the yield of cuprene, by a much lower contamination of the cuprene with catalyst, and by effective regeneration of the catalyst.

The use of cuprous oxide ($Cu_2O$) as a polymerization catalyst for acetylene has been reported in the literature by several investigators. Several objections to the use of such cuprous oxide are known, among which may be mentioned the transfer to the cuprene of substantial amounts of catalyst and the inability to regenerate the cuprous oxide in a practical manner.

This invention is based on the discovery that metallic copper members, for example, in the form of wires, rods, strips, discs or tubes, coated with a film or thin layer of oxidic material gives marked improvements in the catalytic polymerization of acetylene. In view of the chemical conditions under which the film is formed, it is our present belief that this active film is at least partially in the form of cuprous oxide. While such coated metallic copper members may be used in any suitable arrangement for contact with the acetylene, it is advantageous to so arrange and locate the copper members that when the cuprene accumulates on the coated surfaces it can fall away from the catalyst, or otherwise be removed, exposing a fresh surface.

While particles of cuprene with contained cuprous oxide also act as a catalyst, they do so with diminishing effect. According to the invention, the active catalytic surface on the copper is renewed from time to time to obtain a high yield. It is one of the important aspects of the invention to interrupt the operation as the effective polymerization diminishes to a predetermined level and reactivate the metallic copper with a new oxidic surface.

The cuprous oxide surface may be formed initially in any suitable way. One satisfactory method of forming the surface is to react the copper with nitric oxide (NO) at from 400° C. to 500° C. Another effective method which is the subject of our copending application Serial No. 332,544, filed January 21, 1953, comprises oxidizing the surface of the copper with air or the like at a suitably elevated temperature, say, from 350° C. to 400° C., to form cupric oxide (CuO) and then reducing the cupric oxide to cuprous oxide with carbon monoxide at an effective reducing temperature, say, from 200° C. to 400° C.

The invention may advantageously be carried out in a reactor in which there is a large space surrounding the copper members for the circulation of gases and the formation of the bulky cuprene. The positioning of the active surfaces of the copper members so that the accumulated cuprene can be removed readily as by merely falling off plays an important part in the operation because this removes the bulky cuprene from the catalyst. The accumulated cuprene may also be removed by mechanically shaking the copper member. The exposed surface usually contains or develops a coating of cuprene. When the surfaces are rendered relatively inactive by the film of cuprene, the operation is interrupted, the cuprene product is removed, the reactor is evacuated to remove acetylene, and air is introduced into the reactor which oxidizes and removes the adhering film of cuprene, exposing the bare copper which may become oxidized. The surface resulting from the removal of cuprene is reactivated by subjecting it to reducing conditions. One effective means of reduction is to so control the concentration of oxygen that the cuprene coating is decomposed or, in any event, not completely oxidized with the result that it acts as a reducing agent, possibly by releasing carbon monoxide, which seems to convert some of the copper film to the cuprous state. The oxidation with air may be more complete to form a cupric oxide film on the copper. Following this, carbon monoxide is passed over the copper member and the cupric oxide is reduced forming another layer of $Cu_2O$ on the copper. Reactivating the copper embodies two important advantages in operations of polymerizing acetylene. Firstly, there is much less copper used and less contamination of the cuprene with catalyst and its consequent necessity for removal and, secondly, the copper can be reactivated very efficiently and repeatedly.

The accompanying drawing illustrates diagrammatically an arrangement of apparatus for carrying out a method of the invention on a small scale. The apparatus comprises a reactor 1 comprising an enclosed steel chamber 2 surrounded with an electrically heated jacket 3. The wires 4 lead to a thermocouple for measuring the temperature. Acetylene gas from any suitable source passes through the flow meter 5, a supply duct 6, and enters the lower portion of the reactor. The operation may be carried out at pressures below atmospheric pressure to decrease the concentration of acetylene to control the temperature of reaction. However, it may conveniently be carried out at atmospheric pressure by using an inert gas, such as nitrogen, to effect dilution of the acetylene. In the operation illustrated, nitrogen from any suitable source flows through the flow meter 7, duct 8, and into the supply duct 6. Both gases flow upwardly through the reactor and the unreacted gas passes out of reactor duct 9 and can be recycled as desired. For the purpose of reactivating the catalyst, air is introduced into the reactor through duct 12. When carbon monoxide is used to reduce the catalyst, it can also be introduced into the reactor through duct 12.

In order to carry out repeated cycles of operation comprising polymerization followed by the oxidation and reduction of the catalysts, means are provided to evacuate the reactor through duct 14. Several valves V are connected in the duct system, by means of which various sections of the system can be isolated and evacuated by means of the vacuum pump 13. After evacuation, nitrogen can be blown through the reactor to purge it of acetylene before admitting the air.

In carrying out an operation of the invention in the apparatus illustrated, and with $Cu_2O$ formed by oxidation with air and reduction with carbon monoxide, acetylene gas ($C_2H_2$) such as that produced from calcium carbide and which usually contains small amounts of such impurities as sulfides, phosphine, arsine, water and nitrogen containing compounds, is passed into the reactor at the rate desired to maintain the total gas pressure at about one atmosphere and from any convenient source. Continuously with the passing of acetylene, an inert gas, such as nitrogen or argon, is passed into the reactor in an amount depending on the heat evolved during polymerization to effect the required dilution of the acetylene. The amount of inert gas may vary from around three to ten times the volume of acetylene. Both the acetylene and inert gas are preferably preheated before they enter the reactor.

While it is known that polymerization of acetylene with cuprous oxide as the catalyst proceeds at temperatures within the range of 200° C.–300° C., it has been found that the polymer yield at around 300° C. appears to be about 150% greater than at 270° C. However, under controlled conditions, the C/H ratio of the polymer is not significantly altered between these two temperatures. Even at 340° C., the results show that the C/H ratio is less than 5% greater than the average values obtained for the polymer formed at 300° C. At 380° C., a noticeable loss of hydrogen occurs, but this loss of hydrogen probably results from thermal cracking after the polymer is formed. In several high temperature runs only small amounts of "green oil" (high molecular weight condensed polynuclear rings) were obtained. It appears doubtful that large quantities of green oil can be obtained in any event and that the most of the product formed above 340° C. is dehydrogenated polymer. Under certain conditions of temperature and reactor design, the green oil can be condensed and collected.

It is the present preferred practice to carry out the polymerization at temperatures around 300° C. and to continue the polymerizing cycle of the operation so long as an effective yield of polymer is obtained. When the polymerization falls off due to removal of $Cu_2O$ and the formation of a film of cuprene on the catalyst, the acetylene and inert gas supplies are stopped, the acetylene is purged out of the reactor as with nitrogen, the product is removed and protected from oxygen-containing gases until it has cooled, and then air is admitted to the reactor. The copper is at a temperature around 350° C. to 400° C., and the oxygen removes the residual film of cuprene and forms the catalyst. At 400° C. the cuprene film may be removed in about 10 minutes. The air supply may be controlled to decompose the cuprene film and produce the catalytic film. When the air is supplied under conditions to remove the cuprene and oxidize the copper to cupric oxide, carbon monoxide is passed into the reactor to reduce the cupric oxide to cuprous oxide. After reactivation of the catalyst, the polymerization operation is repeated.

The following table illustrates the results of operations carried out in accordance with the invention:

We claim:
1. The method of producing cuprene in the polymerization of acetylene which comprises passing acetylene into contact with a cuprous oxide film on a metallic copper substrate at an elevated temperature above 200° C., thereby producing cuprene relatively low in contained catalyst.
2. The method of producing cuprene in the polymerization of acetylene which comprises passing acetylene into contact with a cuprous oxide film formed on the surface of a metallic copper substrate by oxidation with nitric oxide, and effecting the polymerization at an elevated temperature above 200° C., thereby producing cuprene relatively low in contained catalyst.
3. The method of producing cuprene in the polymerization of acetylene which comprises passing acetylene into contact with a cuprous oxide film on a metallic copper substrate at an elevated temperature around 300° C., thereby producing cuprene relatively low in contained catalyst.
4. The method of producing cuprene in the polymerization of acetylene which comprises passing acetylene into contact with a cuprous oxide film formed on the surface of a metallic copper substrate by oxidation with nitric oxide, and effecting the polymerization at an elevated temperature around 300° C., thereby producing cuprene relatively low in contained catalyst.
5. The method of producing cuprene in the polymerization of acetylene which comprises passing acetylene into a reactor and into contact with a catalytic cuprous oxide film on a metallic copper substrate at an elevated temperature above 200° C., said catalytic film losing effectiveness during polymerization with decreasing yield, and when the yield of cuprene falls to a predetermined amount interrupting the polymerization, reforming the catalytic film by oxidation with an oxygen-containing gas followed by reduction with carbon monoxide, and then resuming polymerization.
6. The method of producing cuprene as defined in claim 5, wherein an inert gas is passed into the reactor along with the acetylene.
7. The method of producing cuprene as defined in claim 5, wherein said elevated temperature is above 250° C.
8. The method of producing cuprene as defined in

| Run No. | Catalyst Preparation ||||||| Polymer Synthesis |||||||
|---|---|---|---|---|---|---|---|---|---|---|---|---|---|---|
| | Catalyst Charge | Type of Oxidation | Oxid. Temp., °C. | Time, Min. | Reduction | Red. Temp., °C. | Red. Time, Min. | $C_2H_2$ Liters/ Minute | $N_2$ Liters/ Minute | Reaction Temp. | Time of Run, Hrs. | Polymer, g. | Catalyst, sq. in. | g./hr./ sq. in. |
| 1 | Cu Strips | Air | 400 | 45 | None | | | 0.5 | 3.3 | 300 | 4.0 | None | 72 | [1] 0 |
| 2 | Cu Strips | Air | 400 | 45 | CO | 300 | 10 | 0.5 | 3.3 | 300 | 4.0 | 2.0 | 72 | [1] 0.0069 |
| 3 | Cu Disc | Air | 400 | 45 | CO | 300 | 7 | 2.0 | 7.0 | 300 | 2.7 | 21.0 | 20 | [2] 0.407 |
| 4 | Cu Disc | NO | 400 | 15 | None | | | 2.0 | 7.0 | 295 | 2.9 | 2.7 | 20 | [2] 0.034 |
| 5 | Cu Strips | NO | 400 | 15 | None | | | 1.5 | 7.0 | 300 | 2.3 | 14.7 | 20 | [3] 0.320 |
| 6 | Cu Strips | NO | 400 | 15 | None | | | 1.5 | 7.0 | 270 | 3.3 | 8.5 | 20 | [3] 0.185 |
| 7 | Cu Basket | Air | 400 | 45 | CO | 300 | 7 | 2.3 | 7.0 | 310 | 4.3 | 82.0 | 580 | [4] 0.033 |
| 8 | Cu Basket | Air | 400 | 45 | None | | | 2.3 | 7.0 | 305 | 3.0 | 56.0 | 240 | [5] 0.078 |
| 9 | Cu Basket | Air | 400 | 45 | None | | | 1.9 | 7.0 | 305 | 3.2 | 50.0 | 240 | [5] 0.065 |
| 10 | Cu Strip | Air | 400 | 45 | CO | 300 | 10 | 1.5 | 7.0 | 300 | 3.7 | 42.0 | 432 | [6] 0.026 |
| 11 | Cu Saddles | Air | 400 | 45 | None | | | 3.1 | 7.0 | 315 | 4.0 | 50.0 | 186 | [7] 0.067 |
| 12 | Cu Saddles | Air | 400 | 50 | None | | | 2.6 | 7.0 | 305 | 4.0 | 72.0 | 186 | [7] 0.097 |
| 13 | Cu Disc | Air | 400 | 45 | CO | 300 | 7 | 2.0 | 7.0 | 285 | 3.7 | 42.0 | 128 | [8] 0.088 |
| 14 | Cu Disc | Air | 400 | 45 | None | | | 2.2 | 7.0 | 300 | 3.7 | 49.0 | 20 | [8] 0.660 |
| 15 | Cu Strip | Air | 400 | 45 | Co | 400 350 300 | 10 | 1.5 | 7.0 | 295 295 295 | 3.0 3.0 3.0 | 2.5 2.7 2.9 | 72 | [9] 0.012 [9] 0.012 [9] 0.013 |
| 16 | | | | | | | | | | | | | | |
| 17 | | | | | | | | | | | | | | |
| 18 | Cu Strip | NO | 400 | 15 | None | | | 0.3 | 0.8 | 300 | 1.0 | 4.2 | 48 | [10] 0.087 |
| 19 | Cu Strip | NO | 400 | 15 | None | | | 0.2 | 0.6 | 340 | 2.75 | 20.5 | 48 | [11] 0.155 |

[1] Air oxidation of a copper surface results in no catalytic activity but a subsequent treatment with carbon monoxide produces a catalyst surface.
[2] Air oxidation followed by carbon monoxide reduction appears to be better than nitric oxide oxidation alone in the steel reactor. The area taken is the cross sectional area of the underside of the disc since the upperside of the disc showed no polymer formation.
[3] Average polymer yield at 300° C. is greater than at 270° C.
[4] Virgin copper.
[5] Regenerated catalyst.
[6] Oxidized and reduced.
[7] Reused copper.
[8] The area of the Cu disc was taken only as the underside of the disc since the upperside of the disc showed no polymer formation. After most of the product of Run 13 was removed from the catalyst, Run 14 was begun without any intermediate treatment of the catalyst.
[9] Reduction temperature does not appear to be too critical.
[10] Argon rather than nitrogen was used as the diluent for acetylene and gave similar results.
[11] Traces of green oil. Approx. 0.5 cc. of green oil obtained.
NOTE.—In Runs 1, 2, 3, 4, 5, 6, 15, 16 and 17 a glass reactor was used—all other catalysts were prepared in a steel reactor.

claim 5, wherein said elevated temperature is about 300° C.

9. The method of producing cuprene in the polymerization of acetylene which comprises passing acetylene into a reactor and into contact with a cuprous oxide film on a metallic copper substrate at an elevated temperature above 200° C., said cuprous oxide film losing effectiveness during polymerization with decreasing yield and with the formation of a layer of cuprene on the copper, and when the yield of cuprene falls below an effective production rate interrupting the polymerization, removing the cuprene which had accumulated on the metallic copper substrate, forming a layer of cupric oxide on said substrate by oxidation with an oxygen-containing gas, reducing said cupric oxide layer to cuprous oxide with carbon monoxide, and then resuming polymerization.

10. The method of producing cuprene as defined in claim 9, wherein said copper substrate in the reactor is arranged in such position that the accumulated cuprene can fall off.

11. The method of producing cuprene as defined in claim 9, wherein said copper substrate is mechanically shaken to remove accumulated cuprene.

12. The method of producing cuprene as defined in claim 9, wherein the accumulated cuprene is removed by passing an oxygen-containing gas at an elevated temperature into contact with said accumulated cuprene.

13. The method of producing cuprene as defined in claim 9, wherein said elevated temperature is about 300° C.

14. The method of producing cuprene in the polymerization of acetylene which comprises passing acetylene into contact with a cuprous oxide film formed on the surface of a metallic copper substrate by oxidation with an oxygen-containing gas followed by reduction with carbon monoxide, and effecting the polymerization at a temperature above 200° C., thereby producing cuprene relatively low in contained catalyst.

References Cited in the file of this patent
FOREIGN PATENTS

| | | |
|---|---|---|
| 438,548 | Great Britain | July 20, 1935 |

OTHER REFERENCES

Egloff et al.: J. Phys. Chem., 36, pages 1472–1476 (May 1932).

Watson: Journal Phys. and Colloid Chem., 54, 969–979.